US009870657B2

(12) United States Patent
Park et al.

(10) Patent No.: US 9,870,657 B2
(45) Date of Patent: Jan. 16, 2018

(54) APPARATUS AND METHOD FOR CONTROLLING DAMPING OF VEHICLE

(71) Applicant: Mando Corporation, Pyeongtaek-si, Gyeonggi-do (KR)

(72) Inventors: Kyoungwon Park, Pyeongtaek-si (KR); Ki Pal Ryu, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/927,226

(22) Filed: Oct. 29, 2015

(65) Prior Publication Data
US 2016/0121689 A1 May 5, 2016

(30) Foreign Application Priority Data

Oct. 31, 2014 (KR) .................... 10-2014-0150718

(51) Int. Cl.
*G07C 5/08* (2006.01)
*B60G 17/019* (2006.01)

(52) U.S. Cl.
CPC .......... *G07C 5/085* (2013.01); *B60G 17/019* (2013.01); *B60G 2400/10* (2013.01); *B60G 2400/204* (2013.01); *B60G 2400/33* (2013.01); *B60G 2400/39* (2013.01); *B60G 2400/41* (2013.01); *B60G 2400/42* (2013.01); *B60G 2401/142* (2013.01); *B60G 2500/10* (2013.01)

(58) Field of Classification Search
CPC .......... B60G 2400/10; B60G 2400/204; B60G 2400/33; B60G 2400/39; B60G 2400/41; B60G 2400/32; B60G 2400/142; B60G 17/019; G07C 5/085

USPC ........................................................ 701/34.4
See application file for complete search history.

(56) References Cited

U.S. PATENT DOCUMENTS 5,987,369 A * 11/1999 Kwak ................ B60G 17/015
280/5.512
2002/0103587 A1 * 8/2002 Kim ................... B60G 17/016
701/37

(Continued)

FOREIGN PATENT DOCUMENTS

JP 7-101272 A 4/1995
JP 2013-173490 A 9/2013

*Primary Examiner* — Krishnan Ramesh
(74) *Attorney, Agent, or Firm* — McDermott Will & Emery LLP

(57) ABSTRACT

The present invention relates to the control of a suspension system of vehicles, and more particularly, to a driver-customized damping control apparatus on the basis of the user's disposition information, and a method thereof. In particular, the present invention provides a damping control apparatus comprising: a mode determining unit that determines a damping mode of the vehicle according to a damping mode configuration signal; a receiving unit that receives a vehicle manipulation signal that is generated according to the vehicle manipulation of a driver; a driver-disposition analyzing unit that analyzes the vehicle manipulation signal and calculates a correction index for the correction of the damping force; and a damping force range determining unit that determines a final damping force range by correcting a damping force range predetermined for each damping mode on the basis of the correction index, and a method thereof.

11 Claims, 9 Drawing Sheets

(56) References Cited

U.S. PATENT DOCUMENTS

| | | | | |
|---|---|---|---|---|
| 2003/0121737 A1* | 7/2003 | Koh | ............... | B60G 17/019 188/266.1 |
| 2010/0076649 A1* | 3/2010 | Iyoda | ............... | B60G 17/0162 701/38 |
| 2010/0191420 A1* | 7/2010 | Honma | ............. | B60G 17/0162 701/38 |
| 2014/0309883 A1* | 10/2014 | Kikuchi | ............ | B60G 17/0162 701/40 |
| 2015/0057885 A1* | 2/2015 | Brady | ............... | B60G 17/06 701/38 |

* cited by examiner (A)

(B)

(C)

APPARATUS AND METHOD FOR CONTROLLING DAMPING OF VEHICLE

CROSS-REFERENCE TO RELATED APPLICATION

This application claims priority from and the benefit under 35 U.S.C. §119(a) of Korean Patent Application No. 10-2014-0150718, filed on Oct. 31, 2014, which is hereby incorporated by reference for all purposes as if fully set forth herein.

BACKGROUND OF THE INVENTION

1. Field of the Invention

The present invention relates to the control of a suspension system of vehicles, and more particularly, to a driver-customized damping control apparatus on the basis of the user's disposition information and a method thereof.

2. Description of the Prior Art

A damping apparatus is a shock-absorbing apparatus that is comprised of a buffering device or springs between the shaft and the frame of the vehicle. In addition, the damping apparatus is referred to as a suspension system, and provides flexibility to the vehicle in the vertical direction thereof in order to thereby buffer the shock and vibration received from the road to prevent the same from being transferred to the body of the vehicle.

Drivers may configure the damping apparatus as a specific mode, and the available range of the damping force may vary depending on the configured damping mode. For example, when the driver selects a desired driving mode, the damping force within a pre-stored available range of the damping force is provided to correspond to the selected driving mode.

However, since the conventional damping apparatus provides the damping force within a predetermined range depending on the mode selected by the driver, it cannot provide the full range of the damping force to consider the user's disposition. That is, the desired range of the damping force may be different according to the individual user's driving habits or vehicle operating habits, but the conventional damping apparatus, which provides a pre-stored damping force range according to the mode selection, cannot satisfy each user's disposition.

In addition, in spite of a growing demand for customizing electronic devices as well as the vehicle, the conventional damping apparatus cannot provide a function of configuring the damping mode according to the user's disposition.

SUMMARY OF THE INVENTION

In this background, the present invention learns all of the user's driving habits, the vehicle manipulating behaviour, and the road conditions, and provides an available range of the damping force that conforms to the driver's disposition.

In addition, the present invention provides a damping control apparatus and a method, which correct and provide the damping force range to conform to each user's disposition even in the damping mode that is configured by the user in order to thereby allow the user to feel more comfortable while operating the vehicle.

In accordance with an aspect of the present invention, a damping control apparatus may include: a mode determining unit that determines a damping mode of the vehicle according to a damping mode configuration signal; a receiving unit that receives a vehicle manipulation signal that is generated according to the vehicle manipulation of a driver; a driver-disposition analyzing unit that analyzes the vehicle manipulation signal and calculates a correction index for the correction of the damping force; and a damping force range determining unit that determines a final damping force range by correcting a damping force range predetermined for each damping mode on the basis of the correction index.

In accordance with another aspect of the present invention, a damping control method may include: a mode determining operation of determining a damping mode of the vehicle according to a damping mode configuration signal; a receiving operation of receiving a vehicle manipulation signal that is generated according to the vehicle manipulation of a driver; a driver-disposition analyzing operation of analyzing the vehicle manipulation signal and calculating a correction index for the correction of the damping force; and a damping force range determining operation of determining a final damping force range by correcting a damping force range predetermined for each damping mode on the basis of the correction index.

As described above, the present invention can learn all of the user's driving habits, the vehicle manipulating behaviour, and the road conditions, and can provide an available range of the damping force that conforms to the driver's disposition.

In addition, the present invention can provide a damping control apparatus and a method, which correct and provide the damping force range to conform to each user's disposition even in the damping mode that is configured by the user in order to thereby allow the user to feel more comfortable while operating the vehicle.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described in detail with reference to the accompanying drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

The present invention relates to a damping control apparatus and a method, which learn the driver's disposition and provide the damping force in consideration of the driver's disposition.

Figure 1:
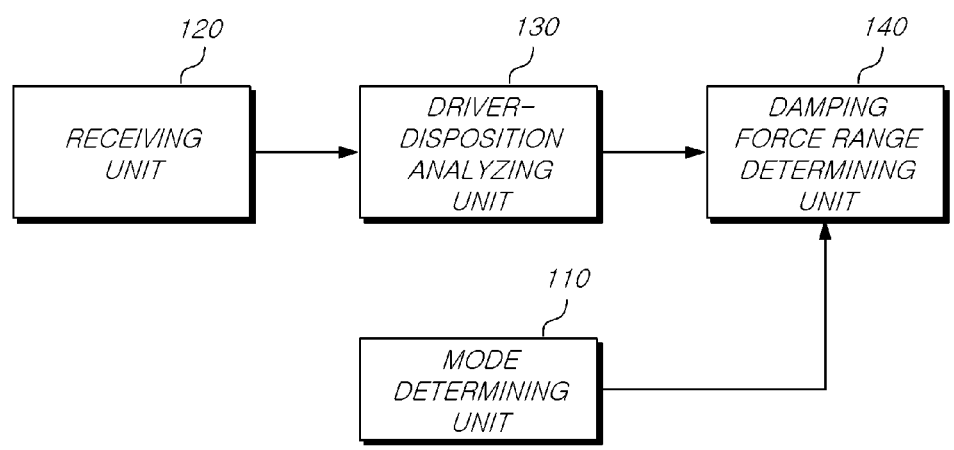
FIG. 1 illustrates the configuration of a damping control apparatus, according to an embodiment of the present invention.

FIG. 1 illustrates the configuration of a damping control apparatus, according to an embodiment of the present invention.

The damping control apparatus 100, according to an embodiment of the present invention, may include a mode determining unit 110 that determines a damping mode of the vehicle according to a damping mode configuration signal, a receiving unit 120 that receives a vehicle manipulation signal generated according to the driver's vehicle operation, a driver-disposition analyzing unit 130 that analyzes the vehicle manipulation signal and calculates the correction index for the correction of the damping force, and a damping force range determining unit 140 that determines the final damping force range by correcting a damping force range predetermined according to the damping mode on the basis of the correction index.

Referring to FIG. 1, the damping control apparatus 100 includes the mode determining unit 110 that determines the damping mode according to the damping mode configuration signal that is generated by the manipulation of the driver. For example, the mode determining unit 110 determines the damping mode according to the damping mode information that is contained in the damping mode configuration signal. One or more damping modes may be provided, and each mode has a predetermined damping force range.

For example, the driver manipulates a damping mode configuration button that is provided in the vehicle in order to thereby configure a specific damping mode. In this case, when a damping mode configuration signal is created, the mode determining unit 110 determines a corresponding damping mode on the basis of the created damping mode configuration signal. When the damping mode is determined, the vehicle is configured with a pre-stored available damping force range so that the damping force corresponding thereto may be provided. More specifically, the damping modes may be comprised of a normal mode, a sport mode, a comfort mode, and an auto mode, and the names of the modes or the number of modes are not limited thereto.

Meanwhile, the damping control apparatus 100 includes the receiving unit 120 that receives the vehicle manipulation signal that is generated in response to the vehicle manipulation by the driver. The vehicle manipulation signal may include one or more of an accelerating-manipulation signal, a decelerating-manipulation signal, a steering angle signal, or a road-barrier-passing speed signal. In addition, the receiving unit may receive the vehicle manipulation signal from each sensor through the communication (for example, CAN communication) in the vehicle.

For more detailed information about the signals, the accelerating-manipulation signal may refer to a signal that is generated by detecting the operation in which the driver manipulates an accelerator pedal, and may be detected by an acceleration position sensor. One or more acceleration position sensors may be installed on the same shaft of the accelerator pedal, and may detect the degree to which the driver steps on the accelerator pedal to thereby output the detected signal. In general, the acceleration position sensor may be configured electronically or physically, and may output signals according to the manipulation of the accelerator pedal by the driver. Accordingly, the accelerating-manipulation signal may be included in the vehicle manipulation signal, and may include the signal generated by the manipulation of the accelerator pedal by the driver for acceleration, and the information about the driver's habits in doing so.

In addition, the decelerating-manipulation signal may refer to the signal that is generated by detecting the operation in which the driver manipulates the brake pedal. For example, it may be detected by a brake pressure sensor. The brake pressure sensor may perform a function of detecting the pressure applied to the pedal when the driver manipulates the brake pedal for deceleration. Thus, the decelerating-manipulation signal, which may be included in the vehicle manipulation signal, may include the information about the driver's habits or disposition when the driver manipulates the brake pedal.

In addition, the steering angle signal may be detected by a steering angle sensor or a torque angle sensor, and may include information on the angle at which the driver manipulates the steering wheel for steering the vehicle. That is, the steering angle signal is the signal that is generated by the driver's manipulation of steering the vehicle, and may include the information about the driver's habits and disposition when the driver manipulates the steering wheel.

The road-barrier-passing speed signal may be detected by a vehicle speed sensor. For example, the road barriers may be road humps. The driver's disposition may be analyzed by using the vehicle speed information when the vehicle passes the road hump. For example, the road barriers may be detected through a change in the brightness of images that are obtained by a camera sensor that photographs the road ahead. For another example, the road barriers may be detected through a change in a sensed value that is created by an acceleration sensor when the vehicle passes the road barrier. Meanwhile, the road-barrier-passing speed information may include the vehicle speed information when the vehicle passes the road barrier, or may include information on a change in the vehicle speed before and after the passage of the road barrier. For example, the information on the deceleration of the vehicle speed when the vehicle approaches the road barrier, and the information on the acceleration of the vehicle speed after the vehicle passes the road barrier may be obtained. That is, the road-barrier-passing speed signal may include at least one piece of the information on the speed at which the vehicle passes the road barrier, the information on the speed at which the vehicle approaches the road barrier, or the information on the speed at which the vehicle leaves the road barrier.

Meanwhile, the damping control apparatus 100 includes a driver-disposition analyzing unit 130 that analyzes the vehicle manipulation signal and calculates the correction index in order to correct the damping force. The driver-disposition analyzing unit 130 may calculate the correction index for the correction of the damping force by using the vehicle manipulation signal that can include the signals described above. For example, the correction index may be obtained by differentiating each signal, or by comparing the value of each signal with a reference value. The detailed operation of calculating the correction index will be described later with reference to the drawings.

Meanwhile, the damping control apparatus 100 includes a damping force range determining unit 140 that determines the final damping force range by correcting a damping force range predetermined according to the damping mode on the basis of the correction index. The damping force range determining unit 140 may determine the final damping force range by using the damping force range information that is predetermined in the damping mode determined by the damping mode configuration signal mentioned above, and the correction index described above. The final damping force range may be determined to have a different section range from the damping force range according to the damping mode, or may be determined to have the same section range as the damping force range according to the damping mode while its position is changed. The detailed operation of the damping force range determining unit 140 for determining the damping force range will be described later with reference to the drawings.

As described above, the damping control apparatus may configure the available damping force range that is suitable for each driver, based on the configuration of the damping mode by the driver and the driver's disposition for the vehicle manipulation. Therefore, the damping control apparatus of the present invention may allow the user to feel more comfortable riding the vehicle even in the same damping mode in order to thereby significantly improve the satisfaction of the driver.

Figure 2:
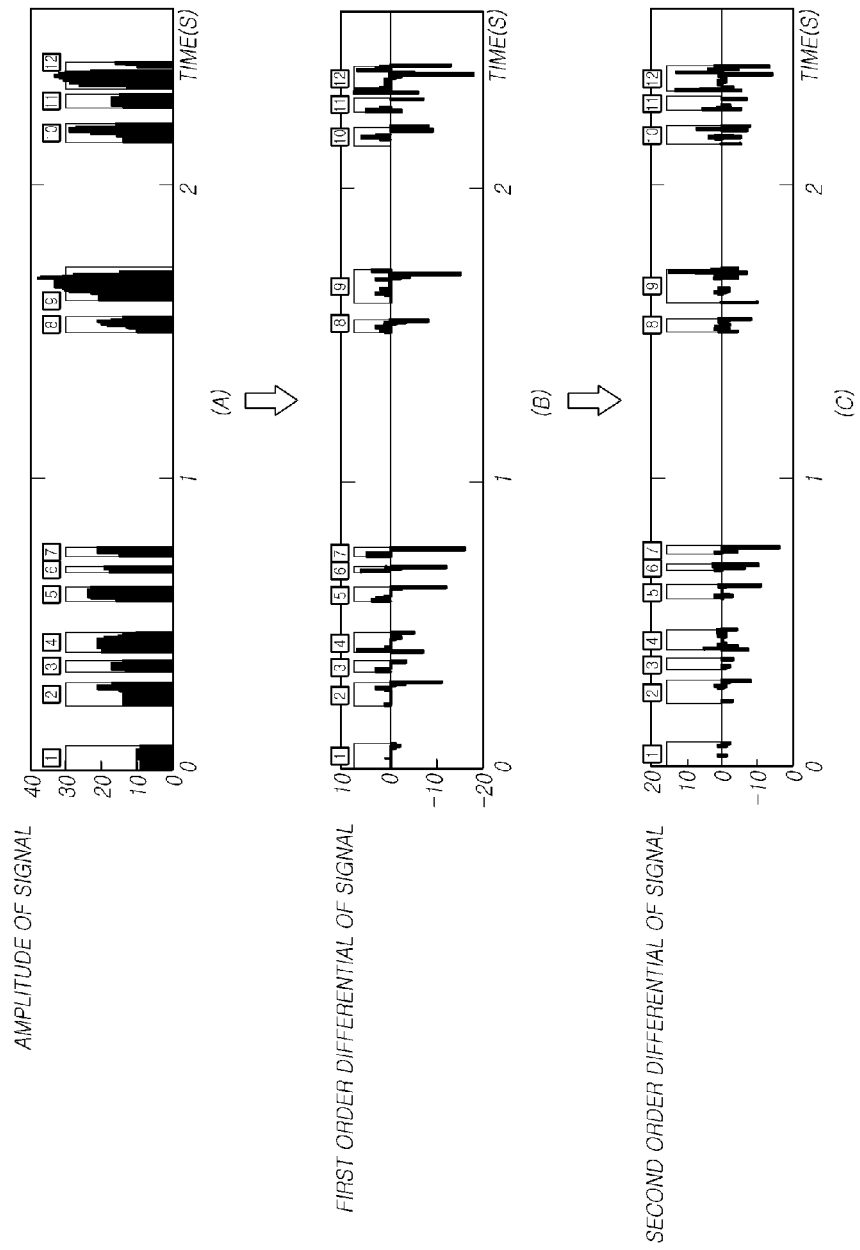
FIG. 2 is a diagram to explain the operation of a driver-disposition analyzing unit, according to an embodiment of the present invention.

FIG. 2 is a diagram to explain the operation of the driver-disposition analyzing unit, according to an embodiment of the present invention.

The driver-disposition analyzing unit of the present invention may calculate one or more of the amplitude, the gradient, and the frequency of the generation of each of one or more signals that are included in the vehicle manipulation signal, in order to thereby obtain the correction index.

Referring to FIG. 2, the vehicle manipulation signal is received with a specific signal amplitude value depending on time. For example, the accelerating-manipulation signal may include different signal amplitude values depending on time, according to the accelerator pedal manipulation of the driver, as shown in diagram (A) of FIG. 2.

In this case, the driver-disposition analyzing unit may calculate the correction index by using one or more of the amplitude, the gradient, and the frequency of generation of the corresponding signal. That is, for example, the driver-disposition analyzing unit may count the signals (9 and 12) of which the amplitudes are equal to or greater than a predetermined reference value of 30 as shown in diagram (A) of FIG. 2, and may calculate the correction index according to the number of times of the corresponding detection.

In addition, the driver-disposition analyzing unit may calculate the correction index by using the nth order differential values of the vehicle manipulation signal as shown in diagrams (B) and (C) of FIG. 2. In other words, the driver-disposition analyzing unit may compare a predetermined reference value with the nth order differential value of the amplitude of each of one or more signals, and may calculate the correction index on the basis of the number of times that the differential values exceed the reference value.

Referring to diagrams (B) and (C) of FIG. 2, the speed component of the signal may be calculated by the first order differential value of the amplitude of the signal, and the acceleration component of the signal may be obtained by differentiating the result again. The driver-disposition analyzing unit may calculate the acceleration component of each vehicle manipulation signal as shown in diagram (C) of FIG. 2, and may compare the result with a predetermined reference value to thereby calculate the correction index on the basis of the number of times that the acceleration component exceeds the reference value. The acceleration component of the signal may include the information showing how sharply the amplitude of the signal is changed, and this provides meaningful information in order to recognize the driver's disposition, such as sudden acceleration, sudden braking, or the sudden turning of the steering wheel. In addition, since the amplitude of the signal provides the information on the degree of the acceleration, the degree of the deceleration, or the degree of the turning of the steering wheel by the driver, it may be used as a factor to determine the driver's disposition. Although the example of analysis using the nth order differential value of the signal is described above, the analysis may be performed by using various signal transformation, such as integrating the signal or summating specific periods thereof to thereby compare the summated value with a reference value. That is, the vehicle manipulation signal may be converted into the information that includes the driver disposition information by using an arithmetic formula in order to thereby calculate the correction index.

Figure 3:
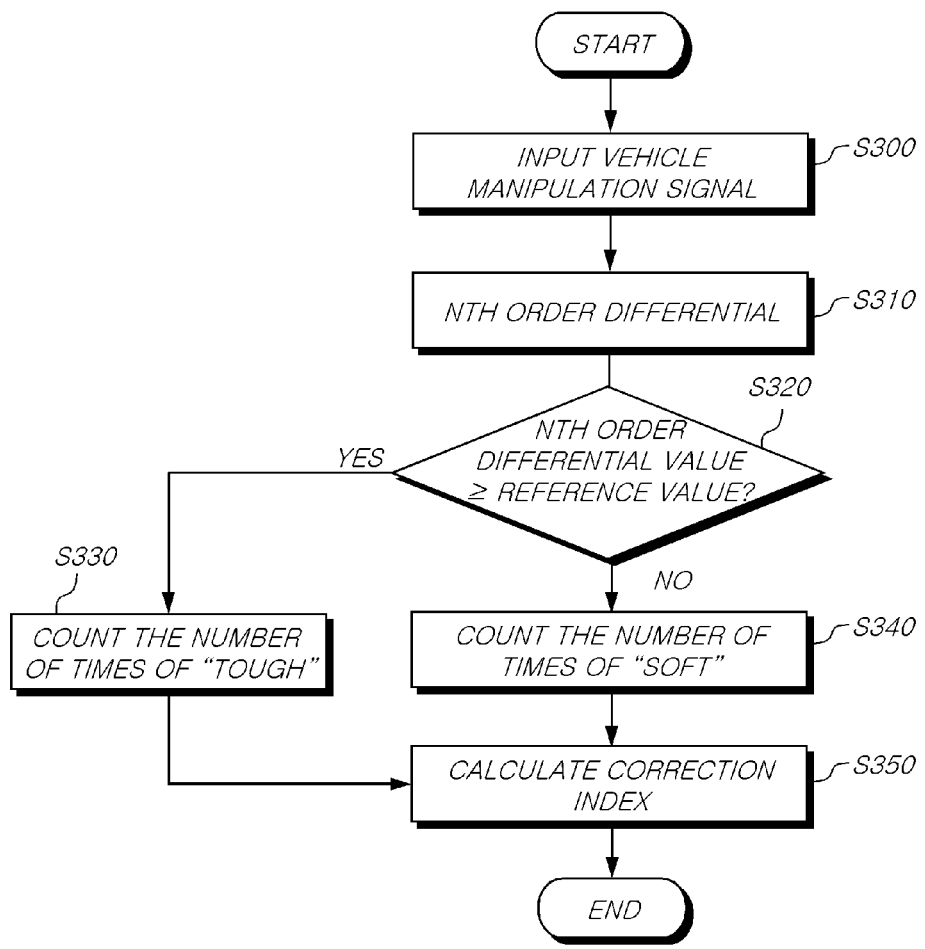
FIG. 3 is a flowchart illustrating the operation in which a driver-disposition analyzing unit calculates a correction index, according to an embodiment of the present invention.

As described in FIG. 2, the driver-disposition analyzing unit may perform the afore-mentioned signal analysis with respect to each of one or more signals that can be included in the vehicle manipulation signal, and may yield the correction index using the result. More detailed descriptions about the calculation of the correction index will be made with reference to FIG. 3. FIG. 3 is a flowchart illustrating the operation in which the driver-disposition analyzing unit calculates the correction index, according to an embodiment of the present invention.

Referring to FIG. 3, the driver-disposition analyzing unit receives the vehicle manipulation signal (S300). The vehicle manipulation signal may include an accelerating-manipulation signal, a decelerating-manipulation signal, a steering angle signal, and the road-barrier-passing speed information, as described above, and may be received through the internal communication protocol of the vehicle.

The driver-disposition analyzing unit may nth-order-differentiate the vehicle manipulation signal (S310). As described in FIG. 2, the operation of the nth-order-differentiating may be omitted in the case where the correction index is calculated using only the amplitude of the signal.

The driver-disposition analyzing unit compares the nth order differential value of the signal with a predetermined reference value (S320). For example, the sharp change in the signal may be recognized according to the second order differential value of the amplitude of the signal, and the second order differential value may be compared with a predetermined reference value. The reference value may be configured to be different according to the amplitude of the signal, the first order differential, or the second order differential. Alternatively, the reference value may be configured to be the same.

The driver-disposition analyzing unit compares the nth order differential value with the reference value to thereby count the number of times of "Tough," in which the nth order differential value exceeds the reference value in a unit period (S330), or to thereby count the number of times of "Soft," in which the nth order differential value does not exceed the reference value (S340).

Afterwards, the driver-disposition analyzing unit calculates the correction index with the factors of the number of times of "Tough" and the number of times of "Soft." The following Equation 1 is an example to explain the formula for calculating the correction index. Thus, the formula for calculating the correction index is not limited to Equation 1, and various formulas may be applied.

$$\text{Correction Index}(DT) = 1 + \frac{\text{Tough determination number} - \text{Soft determination number}}{\text{Total operation number}} \quad \text{Equation 1}$$

In Equation 1, "Tough" determination number refers to the number of times that the nth order differential value exceeds the reference value, and "Soft" determination number refers to the number of times that the nth order differential value does not exceed the reference value. Total operation number denotes the total number of user manipulations that occur in a unit period.

Therefore, as the number of rapid actions, such as the sudden accelerator pedal manipulation, increases, the correction index increases, and as the number of rapid actions decreases, "Soft" determination number increases so that the correction index decreases.

The damping force range determining unit determines the damping force range by using the correction index calculated above.

In addition, the driver-disposition analyzing unit may calculate the correction index according to a predetermined period. For example, in the case of a period of one minute, the vehicle manipulation signal may be updated every one minute in order to newly calculate the correction index. Alternatively, when the vehicle is started, the driver-disposition analyzing unit may calculate the correction index according to a predetermined period. According to this, even if another driver drives the vehicle, the correction index may be calculated to be suitable for the corresponding driver. Therefore, the present invention can analyze the driver's disposition in real-time in order to thereby apply the same to the control of the damping force.

Figure 4:
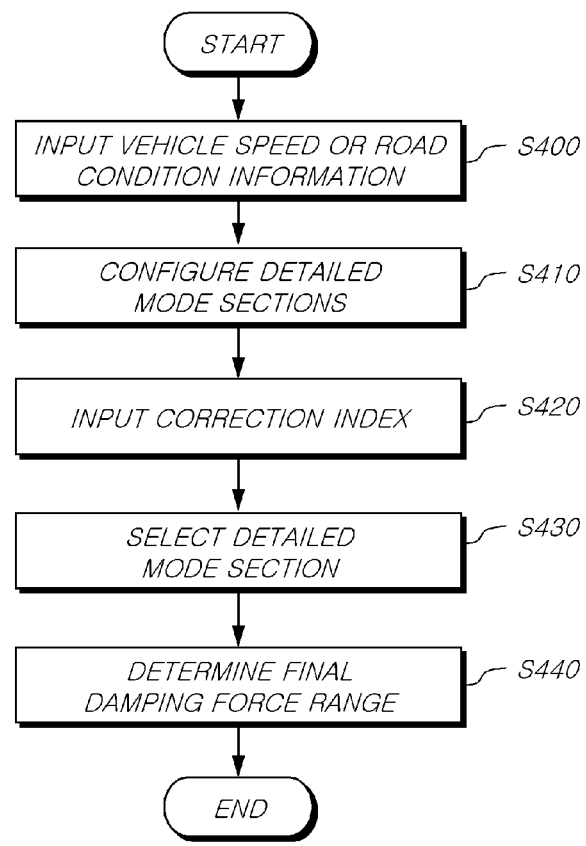
FIG. 4 is a flowchart illustrating the operation of a damping force range determining unit, according to an embodiment of the present invention.

FIG. 4 is a flowchart illustrating the operation of the damping force range determining unit, according to an embodiment of the present invention.

The damping force range determining unit, according to an embodiment of the present invention, may determine the final damping force range by correcting the damping force range predetermined according to the damping mode on the basis of the correction index.

For example, the damping force range determining unit may correct the damping force range predetermined according to the damping mode by using the correction index that is calculated by the driver-disposition analyzing unit to thereby determine the final damping force range. For example, in the case where a predetermined damping force range is provided for each damping mode, the damping force range determining unit may apply the coefficient configured according to the correction index to the damping force range to thereby correct the damping force range. Alternatively, when configuring a control current for the damping control within a damping force range, the damping force range determining unit may alter the control current value by using the correction index to thereby make a control to change the damping force range that is actually provided.

For another example, the damping force range determining unit may further include a detailed mode selecting unit that selects one of the detailed modes that are divided into one or more sections on the basis of the correction index. The detailed mode selecting unit may divide a total value, from which the correction index can be obtained, into one or more sections, and may select the detailed mode of the section corresponding to the correction index that is actually calculated from the driver-disposition analyzing unit. According to this, the detailed mode may be selected according to the correction index.

In addition, the detailed mode selecting unit may select the detailed mode on the basis of one or more pieces of the vehicle speed information, the road condition information, or the correction index. In addition, the detailed mode may be controlled to change the range of each section according to the vehicle speed information or the road condition information. That is, the detailed mode selecting unit may change the size or the position of the section that is separated for each detailed mode on the basis of the vehicle speed information or the road condition information. The detailed mode, to which the correction index belongs, may be selected using the changed section and the correction index.

Referring to FIG. 4, the damping force range determining unit of the present invention may receive the input of the vehicle speed information and/or the road condition information (S400). The vehicle speed information may be obtained through the input of the information on the vehicle speed by using a vehicle speed sensor or a wheel speed sensor. Meanwhile, the road condition information includes the type of road in which the vehicle is currently travelling, or the traffic information thereof. The type of road may be separated into highways, roads, alleys, or the like, and the traffic information may be separated to be normal, congestion, or clear. The traffic information may be obtained using a navigation system in the vehicle or the GPS information and a traffic map, or may be obtained through a camera sensor or a front vehicle detection sensor as well. Alternatively, the traffic information may be obtained using the V2X communication between vehicles or between the vehicle and infra-devices.

Afterwards, the detailed mode selecting unit may change the size or position of the section allocated to each detailed mode by using the vehicle speed information and the road condition information to thereby configure the detailed mode sections (S410). It is due to the fact that the driver's disposition needs to be determined depending on the current road conditions of the vehicle, even with the vehicle manipulation signal of the same user. That is, even though the driver frequently performs the accelerating-manipulation or the decelerating-manipulation in the alley, the frequent manipulation of the driver is caused not by the driver's disposition but by the special situation of the road. Likewise, if the driver frequently performs the accelerating-manipulation or the decelerating-manipulation in a high-speed driving situation, it may represent the driving tendency of the driver, so the detailed mode sections need to be configured separately on the basis of the road conditions or the vehicle speed information.

When the detailed mode sections are configured, the damping force range determining unit may receive the correction index that is calculated by the driver-disposition analyzing unit (S420), and the detailed mode selecting unit may select the detailed mode section to which the corresponding correction index belongs (S430). In other words, the detailed mode, which is separated into one or more sections, may be determined according to the calculated correction index.

The damping force range determining unit corrects the damping force range predetermined according to the damping mode by using the selected detailed mode value to thereby determine the final damping force range (S440).

Hereinafter, the description will be made of the example in which the detailed mode selecting unit changes the range of the detailed mode section depending on the road conditions and the selection of the detailed mode varies with the correction index.

Figure 5:
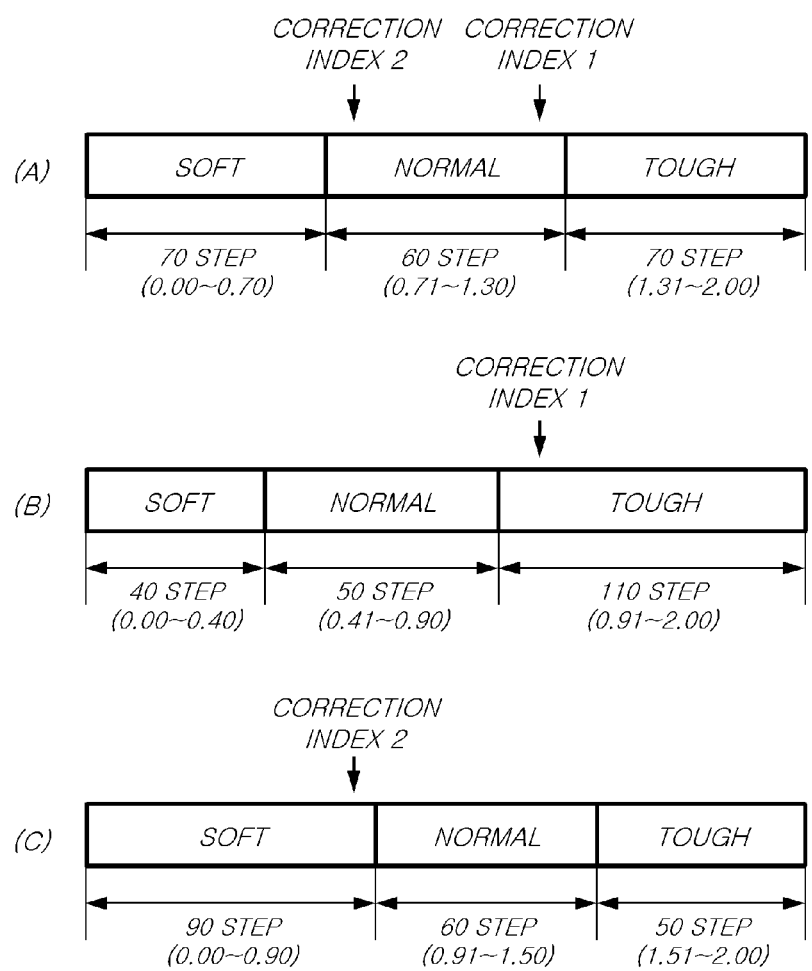
FIG. 5 is a diagram to explain the operation of a detailed mode selecting unit, according to an embodiment of the present invention.

FIG. 5 is a diagram to explain the operation of the detailed mode selecting unit, according to an embodiment of the present invention.

Referring to FIG. 5, it is assumed that there are three detailed modes, and the sections and the names thereof are shown as an example for convenience of description. Therefore, the number of detailed modes, the sections, and the names are not limited thereto.

Diagram (A) of FIG. 5 shows a detailed mode determining operation according to the correction index in the section of the detailed mode, which can be pre-configured. That is, three detailed modes may be separated from each other from the minimum correction index (0) to the maximum correction index (2), which can be calculated by Equation 1. In diagram (A) of FIG. 5, the detailed modes are separated into "Soft," "Normal," and "Tough," and the detailed mode sections have 70 steps, 60 steps, and 70 steps, respectively. Both the correction index 1 and the correction index 2 belong to the "Normal" detailed mode, and the detailed mode selecting unit may select the detailed mode as "Normal."

Diagram (B) of FIG. 5 shows an example in which the detailed mode sections vary depending on the vehicle speed or the road condition information. That is, the section of each detailed mode may be changed and configured by using a predetermined experimental value according to the vehicle speed or the road condition information. As shown in diagram (B) of FIG. 5, "Soft" detailed mode may be reduced to 40 steps, and "Tough" detailed mode may be increased to 110 steps. The detailed mode selecting unit may change and configure the detailed mode sections with reference to a table that pre-stores change values of the detailed mode sections according to the vehicle speed or the road conditions. In this case, the correction index 1 belongs to "Tough" detailed mode, and the detailed mode selecting unit may select the detailed mode as "Tough." Therefore, even with the same correction index 1, the detailed mode may be determined to be different according to the road conditions.

Diagram (C) of FIG. 5 shows an example in which "Soft" detailed mode is increased, and "Tough" detailed mode is reduced, wherein the correction index 2 is determined to belong to "Soft" detailed mode.

As described above, even though the same correction index is given, such as the correction index 1 and the correction index 2, another detailed mode may be configured due to the change in each detailed mode section. This may act as a correction factor in determining the final damping force range to thereby provide different comfort in riding the vehicle depending on the driver. Thus, the damping control apparatus of the present invention determines the driver's disposition in consideration of the road conditions to thereby recognize the driver's disposition more accurately and to provide the damping force according thereto.

Figure 6:
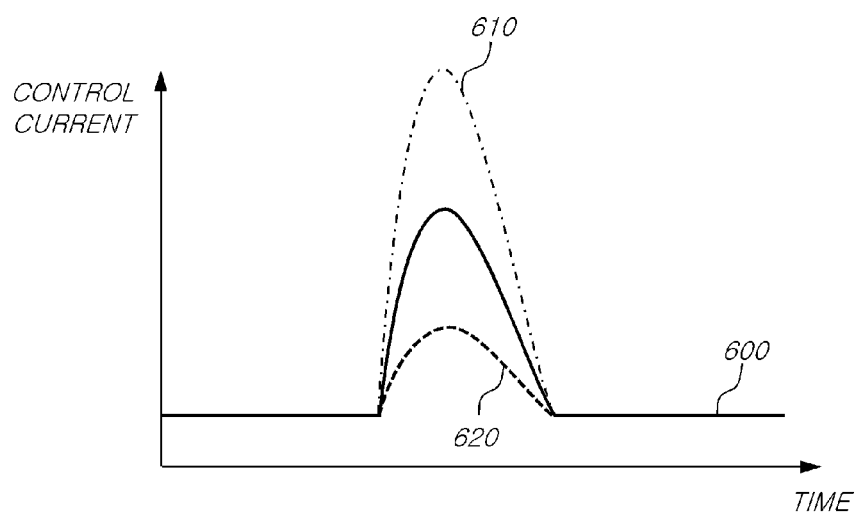
FIG. 6 illustrates an example in which the damping force range determining unit controls a damping control current according to a detailed mode, according to an embodiment of the present invention.

FIG. 6 illustrates an example in which the damping force range determining unit controls a damping control current according to the detailed mode, according to an embodiment of the present invention.

The damping force range determining unit, according to an embodiment of the present invention, may correct the damping force range, which is predetermined in accordance with the damping mode, on the basis of a configuration value that is predetermined for each detailed mode in order to thereby determine the final damping force range.

Referring to FIG. 6, the damping force range determining unit may correct the damping force range predetermined according to the damping mode. That is, the damping force range determining unit may correct the damping force range by using the configuration value that is configured for each detailed mode that is determined by the detailed mode selecting unit in order to thereby determine the final damping force range.

For example, the damping force range determining unit may correct the maximum value or the minimum value of a damping control current by using the configuration value that is configured for each detailed mode in order to thereby determine the final damping force range. In the case of the damping control current 600 that is pre-configured according to the damping mode as shown in FIG. 6, the damping force range determining unit may correct the damping control current value by using the configuration value that is predetermined for each detailed mode.

In other words, in the case where the detailed mode selecting unit selects "Tough" detailed mode, the final damping control current 610 may be calculated by multiplying the damping control current 600 predetermined according to the damping mode by the configuration value of "Tough" detailed mode. On the contrary, in the case where the detailed mode selecting unit selects "Soft" detailed mode, the final damping control current 620 may be calculated by multiplying the damping control current 600, which is predetermined according to the damping mode by the configuration value of "Soft" detailed mode. Since the damping force range may be determined according to the range of the damping control current, the damping force range may be determined to be different according to the detailed mode even with the same damping mode.

Figure 7:
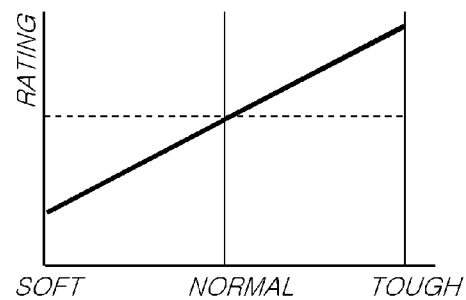
FIG. 7 illustrates various examples in which the damping force range determining unit controls a damping control current in sequence depending on a correction index, according to an embodiment of the present invention.
Figure 7:
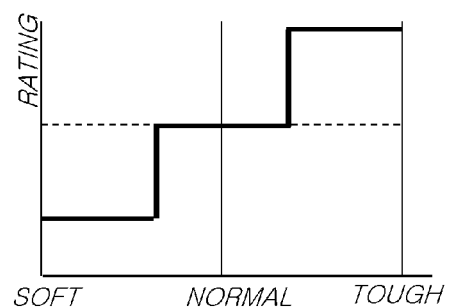
Figure 7:
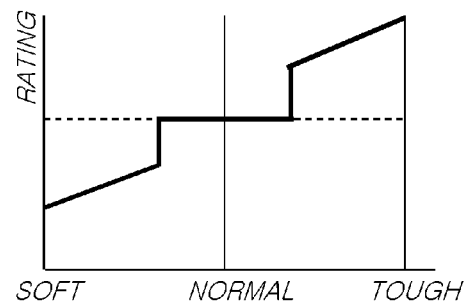

FIG. 7 illustrates various examples in which the damping force range determining unit controls the damping control current in sequence depending on the correction index, according to an embodiment of the present invention.

The damping force range determining unit, according to an embodiment of the present invention, may correct the damping force range predetermined according to the damping mode by using the configuration value that is configured for each detailed mode in order to thereby determine the final damping force range. The damping force range determining unit may change the damping force or the damping control current, which are provided according to the detailed mode, in various ways as shown in FIG. 7.

Referring to FIG. 7, as the detailed mode changes from "Soft" to "Tough," the damping force value may vary in an analog form as shown in diagram (A) of FIG. 7. That is, the provided damping force range may be determined depending on the correction index even in the same "Soft" detailed mode.

Alternatively, as the detailed mode changes from "Soft" to "Tough," the damping force value may vary in a step form as shown in diagram (B) of FIG. 7. That is, the damping force range may be corrected by the same configuration value in the same detailed mode regardless of the correction index.

Alternatively, as the detailed mode changes from "Soft" to "Tough," the damping force value may vary linearly first and then vary discontinuously at the time when the detailed mode changes into another detailed mode, as shown in diagram (C) of FIG. 7. This corresponds to a combination of diagram (A) and diagram (B) of FIG. 7, wherein the damping force range changes linearly and then changes discontinuously when the detailed mode changes into another detailed mode.

The method of changing the damping force range of the present invention is not limited to the embodiments set forth above, and the damping force range may be predetermined according to the user's configuration or the vehicle configuration.

Figure 8:
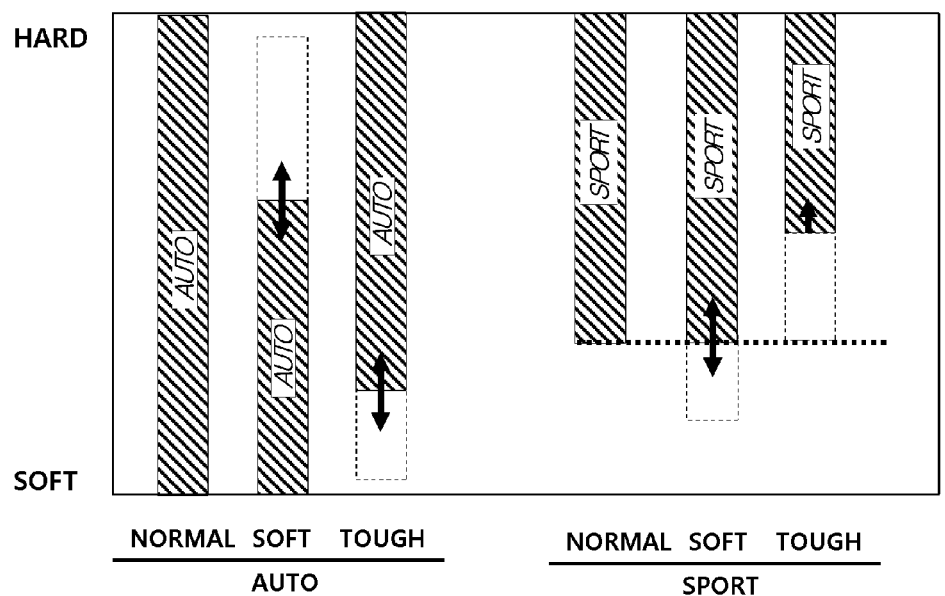
FIG. 8 illustrates an example in which the damping control apparatus changes the damping force range, according to an embodiment of the present invention.

FIG. 8 illustrates an example in which the damping control apparatus changes the damping force range, according to an embodiment of the present invention.

The damping control apparatus of the present invention described with reference to FIGS. 1 to 7 may correct the damping force range in the damping mode that is configured on the basis of the road conditions, the vehicle speed, or the driver's disposition for the manipulation of the vehicle in order to thereby provide the optimal comfort for riding the vehicle to be customized for each driver.

Referring to FIG. 8, the damping mode may be configured as "AUTO," or "SPORT" according to the damping mode configuration signal. Afterwards, the damping control apparatus may analyze the vehicle manipulation signal for a specific time or a specific period to thereby calculate the correction index, and may select the detailed mode by using the calculated correction index and the road condition information. The damping force range of each damping mode may be changed and configured on the basis of the selected detailed mode as shown in FIG. 8.

That is, even when the damping mode is in "AUTO," the damping force range may be changed according to each detailed mode. The change in the damping force range may mean that the damping force range increases or decreases as shown in FIG. 8, or may mean that the section of the damping force range moves while the damping force range is maintained.

Likewise, when the damping mode is in "SPORT," the damping force is provided within a fixed damping force range in the prior art. However, according to the present invention, it may be "SPORT" damping mode by the correction index in the case of "Soft" detailed mode, but the damping force range may be extended or moved toward "Soft" to then be configured. On the contrary, in the case of "Tough" detailed mode, the damping force range may be reduced or moved toward "Tough" to be configured.

The damping control apparatus set forth above may learn the driver's disposition for the vehicle manipulation, and may provide the damping force suitable for the driver so that the driver can be provided with the proper comfort for riding the vehicle. According to this, even though the vehicle is manufactured in the same configuration, comfort while riding the vehicle can be provided differently for each driver through the correction in software so that the satisfaction of the driver can be maximized at a low cost.

Hereinafter, the damping control method set forth above with reference to FIG. 1 to FIG. 8, according to an embodiment of the present invention, will be described briefly once again.

Figure 9:
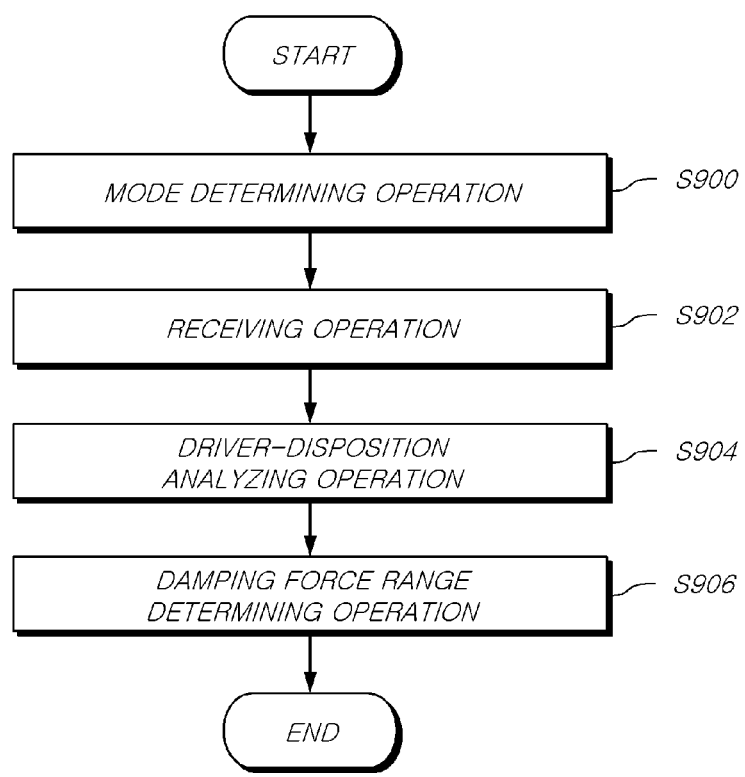
FIG. 9 is a flowchart illustrating a damping control method, according to an embodiment of the present invention.

FIG. 9 is a flowchart illustrating a damping control method, according to an embodiment of the present invention.

A damping control method, according to an embodiment of the present invention, may include: a mode determining operation of determining a damping mode of the vehicle according to a damping mode configuration signal; a receiving operation of receiving a vehicle manipulation signal that is generated according to the vehicle manipulation of a driver; a driver-disposition analyzing operation of analyzing the vehicle manipulation signal and calculating a correction index for the correction of the damping force; and a damping force range determining operation of determining a final damping force range by correcting a damping force range predetermined for each damping mode on the basis of the correction index.

Referring to FIG. 9, the damping control method of the present invention may include a mode determining operation for receiving the damping mode configuration signal caused by a button input of the driver and determining the damping mode (S900). The damping mode may be predetermined and provided in the vehicle, and the driver may change the damping mode through the button operation. The damping force range may be predetermined for each damping mode.

Meanwhile, the damping control method may include a receiving operation of receiving the vehicle manipulation signal generated by the vehicle manipulation of the driver (S902). In the receiving operation, the vehicle manipulation signal is received, and the vehicle manipulation signal may include one or more of an accelerating-manipulation signal, a decelerating-manipulation signal, a steering angle signal, or a road-barrier-passing speed signal. In addition, the receiving unit may receive the vehicle manipulation signal from each sensor through the communication (for example, CAN communication) in the vehicle. Each signal may be received from each sensor in the vehicle as described above.

In addition, the damping control method may include a driver-disposition analyzing operation of analyzing the vehicle manipulation signal and calculating the correction index for the correction of the damping force (S904). In the driver-disposition analyzing operation, the correction index for the correction of the damping force may be calculated by using the vehicle manipulation signal that can include the signals mentioned above. For example, the correction index may be calculated by differentiating each signal, or by comparing each signal with a reference value. Furthermore, in the driver-disposition analyzing operation, the correction index may be calculated on the basis of the vehicle manipulation signal in various ways as set forth above.

In addition, the damping control method may include a damping force range determining operation of determining the final damping force range by correcting a damping force range predetermined according to the damping mode on the basis of the correction index (S906). In the damping force range determining operation, the final damping force range may be determined by using the damping force range information that is predetermined in the damping determined by the damping mode configuration signal, and the afore-mentioned correction index. The final damping force range may be determined to have a section range different from the damping force range according to the damping mode, or may be determined to have the same section range as the damping force range while the position of the section range is changed.

Alternatively, the damping control method may further include a detailed mode selecting operation in which a single detailed mode may be selected from the detailed modes that are configured according to the vehicle speed or the road conditions, by using the correction index. Afterwards, in the damping force range determining operation, the final damping force range may be determined by using the configuration value that is configured in the detailed mode, and the damping force range according to the damping mode.

Furthermore, the damping control method of the present invention may perform all of the operations of the damping control apparatus described with reference to FIG. 1 to FIG. 8.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the invention as disclosed in the accompanying claims. The scope of the present invention shall be construed on the basis of the accompanying claims in such a manner that all of the technical ideas included within the scope equivalent to the claims belong to the present invention.

What is claimed is:

1. A damping control apparatus comprising a controller configured to:
   determine a damping mode of the vehicle according to a damping mode configuration signal;
   receive a vehicle manipulation signal that is generated according to the vehicle manipulation of a driver;
   analyze the vehicle manipulation signal and calculate a correction index for the correction of the damping force; and
   determine a final damping force range by correcting a damping force range predetermined for each damping mode on the basis of the correction index,
   wherein the controller yields the correction index by calculating one or more of the amplitude, the gradient, and the frequency of generation of each of one or more signals that are included in the vehicle manipulation signal.

2. The apparatus of claim 1, wherein the vehicle manipulation signal includes one or more of an accelerating-manipulation signal, a decelerating-manipulation signal, a steering angle signal, or a road-barrier-passing speed signal.

3. The apparatus of claim 2, wherein the road-barrier-passing speed information includes the vehicle speed information when the vehicle passes a barrier on the road, which is detected using a camera sensor or an acceleration sensor, or the information on a change in the vehicle speed before and after the passage of the road barrier.

4. The apparatus of claim 1, wherein the controller compares a predetermined reference value with an nth order differential value of the amplitude of each of one or more signals, and calculates the correction index on the basis of the number of times that the differential value exceeds the reference value.

5. The apparatus of claim 1, wherein the controller calculates the correction index according to a predetermined period.

6. A damping control apparatus comprising a controller configured to:
   determine a damping mode of the vehicle according to a damping mode configuration signal;
   receive a vehicle manipulation signal that is generated according to the vehicle manipulation of a driver;
   analyze the vehicle manipulation signal and calculate a correction index for the correction of the damping force; and
   determine a final damping force range by correcting a damping force range predetermined for each damping mode on the basis of the correction index,
   wherein the controller selects one of detailed modes, which include one or more sections, on the basis of the correction index.

7. The apparatus of claim 6, wherein the controller selects the detailed mode on the basis of one or more pieces of the vehicle speed information, the road condition information, or the correction index.

8. The apparatus of claim 6, wherein the section range of the detailed mode is changed according to the vehicle speed information, or the road condition information.

9. The apparatus of claim 6, wherein the controller corrects the damping force range predetermined according to the damping mode by using the configuration value predetermined for each detailed mode to thereby determine the final damping force range.

10. A damping control method comprising:
    a mode determining operation of determining a damping mode of the vehicle according to a damping mode configuration signal;
    a receiving operation of receiving a vehicle manipulation signal that is generated according to the vehicle manipulation of a driver;
    a driver-disposition analyzing operation of analyzing the vehicle manipulation signal and calculating a correction index for the correction of the damping force; and
    a damping force range determining operation of determining a final damping force range by correcting a damping force range predetermined for each damping mode on the basis of the correction index,
    wherein the driver-disposition analyzing operation comprises calculating one or more of the amplitude, the gradient, and the frequency of generation of each of one or more signals that are included in the vehicle manipulation signal in order to thereby yield the correction index.

11. The method of claim 10, wherein the damping force range determining operation further comprises a detailed mode selecting operation of selecting one of the detailed modes, which are divided into one or more sections, on the basis of the correction index.

* * * * *